(12) United States Patent
Delgado et al.

(10) Patent No.: US 11,778,981 B2
(45) Date of Patent: Oct. 10, 2023

(54) MODULAR AUTONOMOUS MOBILE FENCE, DELIMITER OF GRAZING AREAS

(71) Applicants: Antonio Juan Rossi, Buenos Aires (AR); IRRI MANAGEMENT S.A., Buenos Aires (AR); TIOS S.A., Buenos Aires (AR)

(72) Inventors: Roberto Gabriel Delgado, Buenos Aires (AR); Gabriel Osvaldo Santos, Buenos Aires (AR); Antonio Juan Rossi, Buenos Aires (AR); Martin Pasman, Buenos Aires (AR); Juan Manuel Fernandez Arocena, Buenos Aires (AR)

(73) Assignees: TIOS S.A., Buenos Aires (AR); Antonio Juan Rossi, Buenos Aires (AR); Gabriel Osvaldo Santos, Buenos Aires (AR)

( * ) Notice: Subject to any disclaimer, the term of this patent is extended or adjusted under 35 U.S.C. 154(b) by 96 days.

(21) Appl. No.: 17/461,257

(22) Filed: Aug. 30, 2021

(65) Prior Publication Data
US 2022/0117192 A1  Apr. 21, 2022

(51) Int. Cl.
*A01K 3/00* (2006.01)
*E04H 17/06* (2006.01)
*E04H 17/00* (2006.01)

(52) U.S. Cl.
CPC .............. *A01K 3/001* (2021.08); *A01K 3/005* (2013.01); *E04H 17/017* (2021.01); *E04H 17/06* (2013.01)

(58) Field of Classification Search
CPC ........ A01K 1/105; A01K 3/001; A01K 3/005; E04H 17/02; E04H 17/06; E04H 17/10; E04H 17/127; E04H 17/131; E04H 17/18; E04H 17/266; E04H 17/017
See application file for complete search history.

(56) References Cited

U.S. PATENT DOCUMENTS 4,078,771 A * 3/1978 Diggs .................... A01K 1/105
256/10
4,407,485 A * 10/1983 Standing ............... E04H 17/017
256/10

(Continued)

FOREIGN PATENT DOCUMENTS

DE 4215714 A1 * 11/1993 ............. A01K 3/005
FR 2550053 A1 * 2/1985

*Primary Examiner* — Jonathan P Masinick
(74) *Attorney, Agent, or Firm* — Hoglund & Pamias, PSC; Roberto J. Rios (57) ABSTRACT

Modular autonomous mobile fence, delimiter of grazing areas. It consists of two structures (10, 20) arranged opposite and distant from each other. Each structure (10, 20) is composed of at least two movable towers, arranged at the ends of the very same row and structurally linked to each other to form a movable row. An electric wire conductor (14, 15) is arranged between these two rows (10, 20) and forms a closed quadrilateral that delimits a closed grazing area (16). Said rows with towers and the area delimited by the electric fence can be selectively moved from one lot to the next, together with the animals kept therein. Said electric fence must have means of separation (31, 32) of the electric conductor from the ground (14, 15) and at least one of the mentioned towers must have means of tensioning (34) the electric conductor.

19 Claims, 7 Drawing Sheets

(56) References Cited

U.S. PATENT DOCUMENTS

| | | | | |
|---|---|---|---|---|
| 7,573,223 | B2* | 8/2009 | Vlaar | A01K 3/005 |
| | | | | 318/587 |
| 10,663,979 | B2* | 5/2020 | Grundey | G05D 1/0278 |
| 11,617,345 | B2* | 4/2023 | Bassett | E04H 17/10 |
| | | | | 119/512 |
| 2010/0077960 | A1* | 4/2010 | Van Den Berg | A01K 3/005 |
| | | | | 119/14.17 |
| 2013/0269625 | A1* | 10/2013 | Van Den Berg | A01K 1/123 |
| | | | | 119/416 |

* cited by examiner

MODULAR AUTONOMOUS MOBILE FENCE, DELIMITER OF GRAZING AREAS

FIELD OF THE INVENTION

The present invention relates to a device capable of delimiting grazing areas, by setting an electric perimeter where a certain number of cattle heads is enclosed, said cattle is selectively moved along with the mobile fence from one lot to another, by following a specific sequence or control commands for the movement of said mobile fence.

More precisely, the present invention consists of a selective mobile fence wherein a herd of cattle is contained, restrained, and compelled to move within the same perimeter fence as it moves from one grazing area to another.

This mobile fence basically consists of two mechanically stable and resistant structures that define each row and are moved on wheels. These two structures or rows work in parallel and at a distance one from the other, and with synchronized movements. These two mobile structures are connected by an electric wire fence, thereby creating an area where animals can graze inside.

Each structure consists of at least two self-propelled towers that are significantly aligned along the same line. For practical purposes of the project development, and with no limitation or restriction to the scope of the present invention, two "Valley" front advance irrigation systems are used as mobile rows which will become part of the mobile fence, in such a way that these self-propelled irrigation systems are utilized to build the fence that enables intelligent grazing.

With a comprehensive use of these systems, the mobile fence of the invention can be mounted in any front advance irrigation system and convert it into an autonomous and mobile fence which can be programmed to obtain the best use of resources and achieve better yields.

These structures move at programmable intervals which allow the adjustment of grazing time, respecting optimal physiological periods for pasture growth, combined with a high animal load. In this manner, it is possible to maximize the efficiency of pasture production and the efficiency of animal production. The result is a greater production of meat per hectare than in traditional grazing. Furthermore, optimal distribution of manure is achieved, which will be transformed into nutrients that will promote the growth of pastures.

Maximum speed of the fence is determined by the speed of the motors of the irrigation equipment and the size of the wheels. In general, the speed of the motor is 68 rpm and the size of the wheels 14.9-24, which makes it possible to calculate a 100% movement of 4.26 m per minute (14 feet). As an example, it can be said that at 100% speed, the fence covers 100 meters in 22.22 minutes. The speed of each self-propelled tower can vary the speed in percentage from 100% to 0%, in which it would be stopped: The system calculates the advance speed according to the percentage that is established by the control device.

Distance covered at 100% per minute according to percentage, can be estimated by the following formula:

Example at 100%:

$$T(\min) = (\text{distance in } m. \div D \min. = \% \times 4.26)$$

Dmin=100×4.26
T(advance)=23.47 min.

Example at 50%:

$$D \min = 50 \times 4.26 / 100$$

Dmin=2.13 m/min

T(advance)=46.94 min.

Example at 25%:

$$D \min = 25 \times 4.26 / 100$$

Dmin=1.06 m/min
T(advance)=94.33 min.

The structure of the ramps or towers can be modular, as seen in all irrigation equipment. Ideally, but without being a limitation, each module has a standard length of 54.5 m and a standard height of 3.65 m. Up to 7 modules can be added to each structure, amounting to 380 meters, which allows this fence to delimit a certain area once these two parallel and distant structures have the electric fence laid between them by way of a filiform fence, forming a square or rectangle where livestock is to be kept for grazing.

Figure 5:
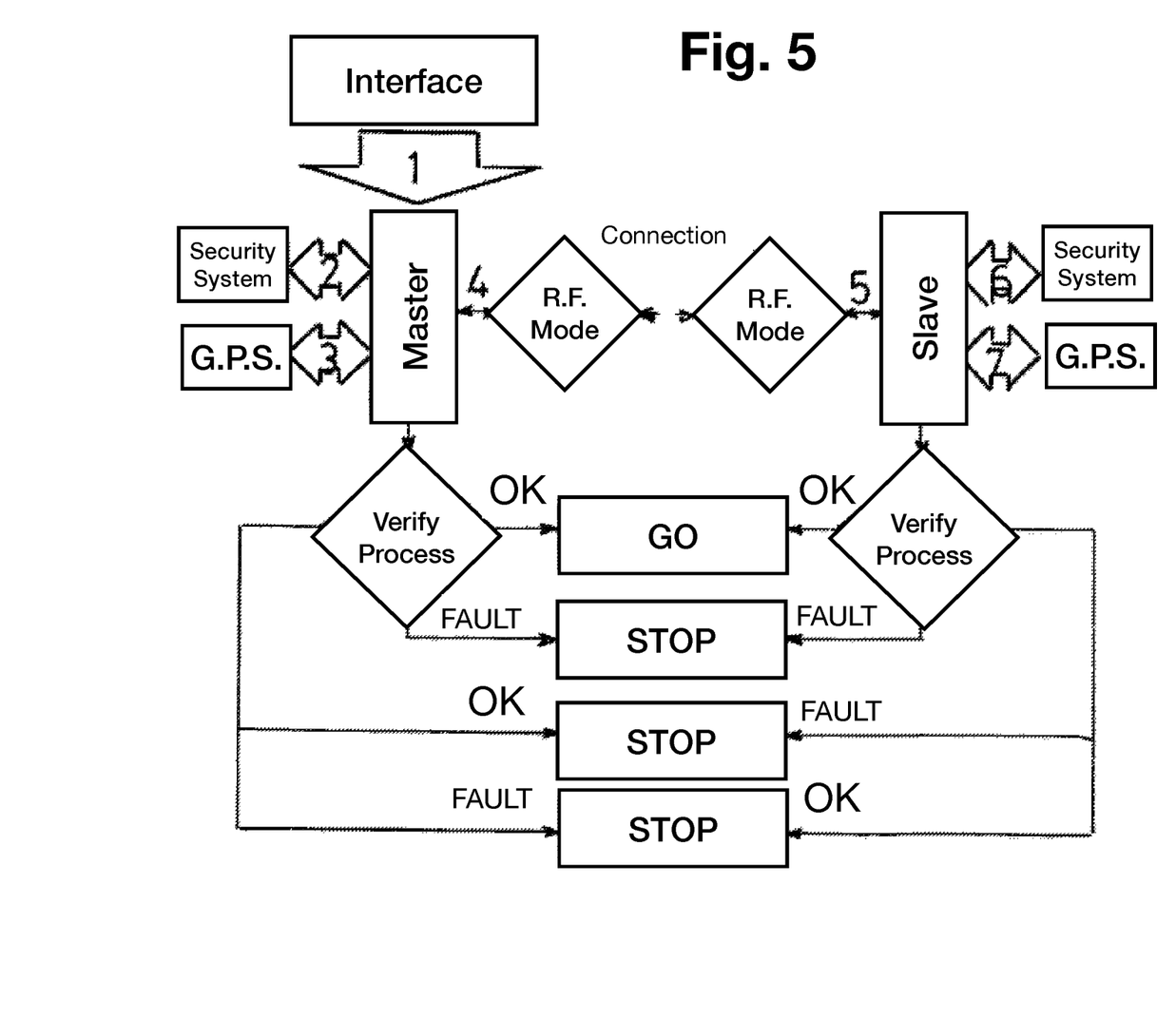
FIG. 5 shows a block diagram of one of the possible operation modalities of the mobile fence of the invention.

To control the displacement of the mobile fence of the present invention, see FIG. 5, which shows a block diagram regarding the operation of master and slave controls. "Master control" panel can be operated manually and remotely, or in the very same grazing area, which allows programming the displacement requirements of the equipment. The fence also includes a "slave control panel" which responds to the commands of the "master control panel". These panels control the displacement of the ramps and synchronize their movements.

FIG. 5, operator's interface includes:
Panel Keys (forward, backwards),
Telemetry system,
Speed control (%), and
Requirements and programs.

Control of the towers of the fence is shown through the operator's interface by panel keys or telemetry, which are located in the "master control panel". Said panel receives the commands set by the operator and checks the security system and GPS location, then it sends a radiofrequency signal to the "slave panel" which checks the security system of that ramp and its location and then sends the information back. Once these variables are checked and in proper condition, the fence moves according to the orders instructed by the operator. In case any of these variables do not comply with the conditions or present any flaws, the equipment stops the faulty ramp or tower and reports to the other panel so that it will not advance, thereby stopping the displacement of the fence.

The perimeter fence of the invention has several suitable levels of security that take advantage of the inherent characteristics of renowned irrigation systems. The mobile fence will use this known physical security structure to verify the status of the units and through the control panels the security level is determined, thus, giving way to the commands received or stopping the equipment in case of failures in the system.

1.—If each structure is composed of more than a pair of self-propelled towers, a security check is performed by a closed circuit that sends a signal which shall return to the panel where the closure of the circuit is recorded. Micro switches are placed between each tower of the same alignment so that if one tower moves forward and the other stops due to a flaw, said micro switches interrupt the signal and pause the equipment.

2.—In case each alignment consists of just a pair of towers, a device is installed in only one of these towers that detects when this tower fails to move forward and shuts off the closed circuit, if the signal is not received the entire fence stops.

3.—In all cases, the electronic system checks the closed circuit, if not detected, it sends a stop signal to the second parallel series of towers. Communication between towers is also established through a signal verification and if this communication is not detected, the system of the parallel towers will not validate advancement.

In case of loss of control signal, the security system acts by stopping the ramps and after the signal recovery time has elapsed, usually 3 seconds, security of the system is guaranteed.

In a convenient and known way, each tower has multi directional motor units which allow each tower to move in a selective orthogonal or even oblique direction.

The rows of towers can transport small individual water troughs distributed in a hanging manner in each tower or along the structure that links the towers of the same row structure where troughs are supplied by refrigerated tanks with a storage capacity of, for example, 4,000 to 16,000 liters of water. These tanks can be refilled either manually or automatically, by means of an underground or overhead water distribution system from the nearest drilling well. As an example, the water supply system can include a drag hose connected to hydrants along the lot which provide water from deep water wells. They can also be connected to a pumping system from a storage tank in the field depending on the water source available. Then, there is a vertical hose in the equipment that is connected to the water inlet elbow, at the other end of which there is a drag hose that takes water to the inlet of the first pipe of the irrigation system at the vertex of the equipment. The main pipe of the equipment is composed of a series of pipes which belong to the structure, joined by flanges and gaskets, and held in place by hangers which take the water along the section between each pair of towers in the same row. Downspouts are distributed along the section between the pair of towers in the same row at equal distances to provide water for both irrigation and drinking, with a sprinkler and trough assembly for each downspout to supply water for consumption. Finally, the sprinkler is located at the free end of the downspout and calibrated according to the flow rate applied and previously measured, as well as the water troughs that are activated by animals whenever they need to supply themselves with the liquid.

For practical purposes, the equipment consists of a main pipe where water circulates, which may be from 10 cm to 20.60 cm diameter. It is supported by a system of steel crossbars and wrought iron tensing rods, which connects the main pipe to the two towers in the same row, also made of galvanized steel angles, and supported by two wheels. The main pipe has water outlet couplings along the ramp, at a distance that can vary from 1 to 3 meters, gooseneck shaped, and sprinklers to refresh animals or irrigate pastures.

Each tower has a water tank with a capacity of 1,500 to 3,000 liters which can be refrigerated by forced air circulation.

Object of the present invention:

The object of the present invention is to provide a self-propelled electric mobile fence capable of confining, within a closed perimeter delimited by the laying of an electric conductor, a number of animals that are expected to move together with the mobile fence.

It is the object of the present invention to provide a fence with two self-propelled structures where each structure is determined, at least, by two towers significantly arranged in the same row and connected by a structure. That is to say, two rows, one opposite the other and spaced apart, laterally connected by the aforementioned electric conductor.

It is the object of the present invention to provide each of the above-mentioned towers with a control system that commands these structures to give the necessary orders to achieve efficient grazing, allowing the synchronized movement of the two ramps or rows to locate them within the lots intended for this purpose.

The object of this invention is to make an electric fence with a self-tensioning mechanism that allows to maintain the limits of the fence and keep the animals inside.

It is also the object of the present invention to make use of the advantages provided by the existing irrigation equipment, whose towers are self-propelled and capable of bidirectional displacements.

The object of the present invention is to have the rows of said towers equipped with a renewable energy system, such as solar panels along with a diesel generator which are supplemented to reduce environmental and noise pollution.

The object of the present invention is to provide each row of towers with a system of water troughs with tanks on the towers to supply the water necessary for animals' consumption.

The object of the present invention is to provide the electric fence with a hanging or separation system to keep it distanced from the ground level and ideally at a significantly constant height, allowing the equipment to move to zones of tall grasses and remain inside the grazing area.

The object of this invention is to provide a fence that can be installed in any front advance irrigation system and transform it into an autonomous and dynamic fence, which can be programmed to take maximum benefit from the resources and achieve better grazing yields.

It is also the object of the present invention to make these structures move at programmable intervals to allow the control of the grazing time while respecting optimal physiological periods of pasture growth, combined with a high animal load, maximizing the production efficiency of pastures and the harvesting efficiency of the animals, and achieving efficient distribution of manure, which will be transformed into nutrients that will promote the growth of pastures.

SUMMARY OF THE INVENTION

MODULAR AUTONOMOUS MOBILE FENCE, DELIMITER OF GRAZING AREAS composed of two structures which are set significantly opposed and distanced from one another. Each structure is composed of at least two movable towers, set at the ends of the same row where these two towers belong to the same row and are structurally linked to each other. At least one electric wire conductor that forms a closed quadrilateral is laid along each row and from one extreme tower of a row to the other tower of the opposite row and belonging to the same side, thus delimiting the area where a number of animals is placed inside. Said rows, towers and the area delimited by the electric fence along with the animals kept inside can be selectively moved from one lot to the following; at least part of the laying of said electric fence must have means of separation of the electric conductor from the ground.

DETAILED DESCRIPTION OF THE INVENTION

In order to specify the preferred embodiments of the present invention, the aforementioned drawings illustrate those in detail, supported by the description given below, these embodiments must be interpreted as one of many possible constructions of the invention therefore, it is not appropriate to assign any limiting value to it, and the possible means equivalent to those illustrated are included within the scope of the invention. The scope of the present invention is determined by the first claim annexed in the corresponding chapter of Claims. Furthermore, in these drawings, the same references identify equal and/or equivalent means.

Figure 1:
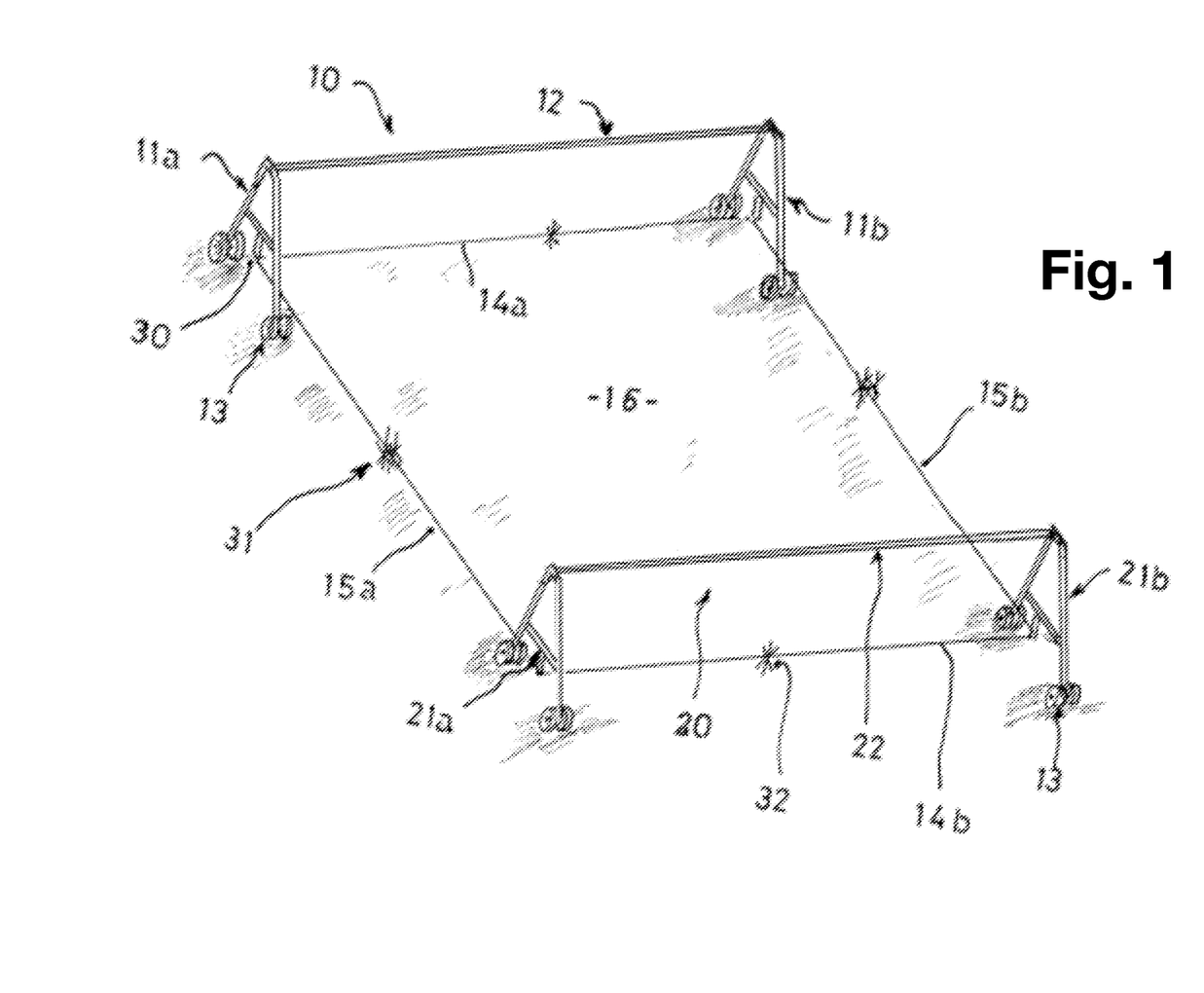
FIG. 1 illustrates the field or lot on which two rows have been placed, where each row consists of a pair of end towers connected to one another, and the laying of an electric fence perimeter with separation means of the electric ground conductor.

FIG. 1 is identified with the generic reference (10) to a row formed by the first movable tower (11a) and the second movable tower (11b), both located at the ends of row (10). Similarly, in the other row (20), a row formed by a first movable tower (21a) and a second movable tower (21b) is observed, both located at the ends of said row. Each row has its towers (11, 21) mechanically linked to each other, so that the pair of towers (11a, 11b) is mechanically linked by a structure (12) and the pair of towers (21a, 21b) is linked by structure (22).

These two structures or rows (10, 20) are shown schematically and simplified in the above mentioned FIG. 1. These rows (10, 20) work significantly in parallel and at a distance from each other, and with synchronized movements. Each tower (11, 21) is supported by means of transport, such as a wheeled train (13), and each tower is composed of a mechanically rigid and stable structure which can be dragged or have an associated drive system, either a hydraulic or electric motor (not illustrated). Towers of irrigation systems are preferably used since these structures are known and widely proven. The drive system allows each tower to move independently.

As already mentioned above, any irrigation tower can be used for the purpose of the present invention, and in particular, the use of a front advance irrigation system under the brand "Valley" would be preferable. Row structures with towers can be modular as seen in all irrigation equipment. Ideally, but without being a limitation, each module has a standard length of 54.5 m and a standard height of 3.65 m. Up to 7 modules can be added to each structure, amounting to 380 meters.

Each row has at least one electric conductor laid lengthwise and between the end towers (14a, 14b) (see FIG. 1), and between the end towers of the opposite rows, there is another section (15a, 15b) of the same electric conductor which forms a closed geometric figure, ideally a quadrilateral, which allows the mobile fence of the invention to delimit an area (16) determined by the latter with least one continuous electric conductor. A certain number of animals is placed inside this area (16) (not illustrated) and they are moved by the electric perimeter fence as the fence moves.

Finally, regarding FIG. 1, reference (30) shows one of the possible means capable of tensioning the electric fence, where (31) and (32) are devices that allow to keep the conductor separated from the ground and at a significantly constant height.

Figure 2:
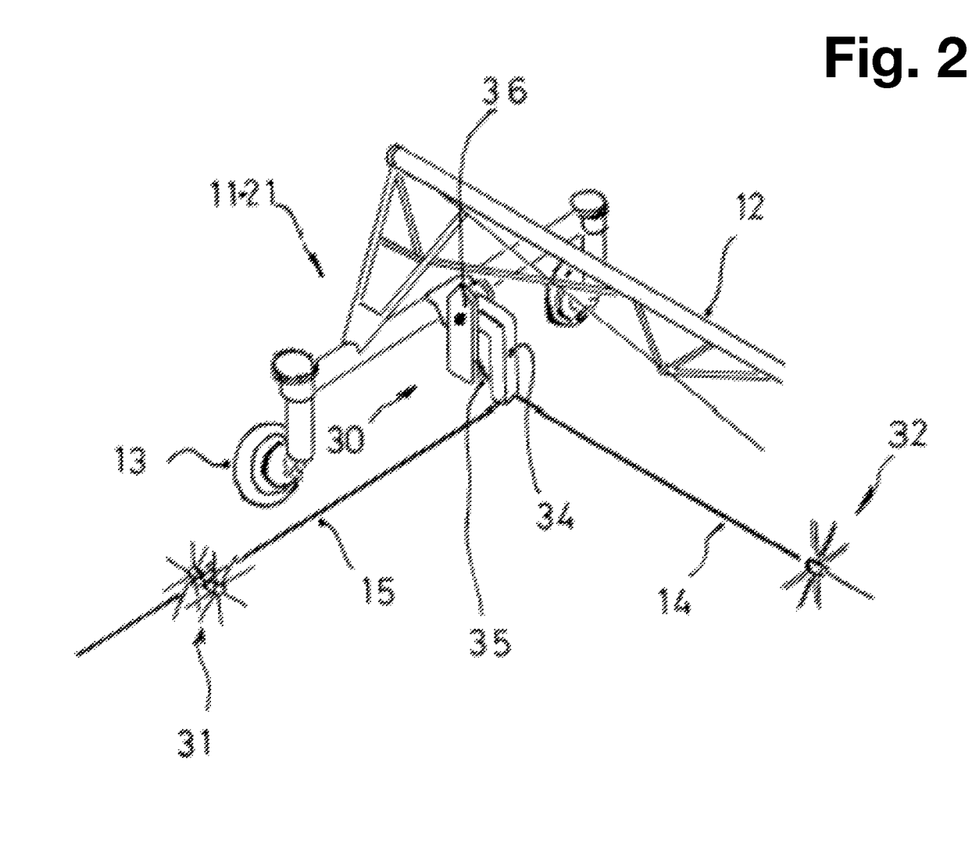
FIG. 2 shows an enlarged detail of an end tower of a row and the junction of the sections of the electric conductor, as well as the construction of the tensioning means of said conductor, FIG. 3 show, in different positions, one of the possible separating or distancing devices of the conductor from the ground, FIG. 4 show, in several positions, another possible means of separating or spacing the conductor from the ground.

FIG. 2 shows in detail one of the towers. Each tower (11, 21), if it is not one of the intermediate towers of the row (10, 20), defines a vertex of the quadrilateral (16), as illustrated in the figure. The figure shows one of the possible structures (12) for the connection of the towers that form the row, and the tensioning device (30) of the electric wire conductor. This tensioning means can consist of a pivoting piece linked (34) to the tower at the top (36), so that its free lower end extends downwards. This free lower end is joined to the vertex of the area (16) at the union of the sections (14, 15) of the electric wire conductor, and it conveniently has a spring or elastic means of tension (35) that pulls the aforementioned body (34) towards the vertical. Reference 31, in the same figure, shows one of the means that keeps the wire conductor at a certain height from the ground (15) that is to say, the section of wire conductors that are arranged between the ends of towers in the opposite rows, while reference (32) identifies the device that keeps the conductor at a certain height from the ground (15), that is to say, the section of conductors that are arranged between the ends of towers of the opposite rows, and reference (31) identifies the means that keep the conductor at a certain height from the ground (14), that is to say, the section of conductors that are arranged between towers of the same row (10, 20).

FIGS. 3a, 3b 3c and 4a, 4b, 4c show a wheel system that separates the electric conductor and allows said conductor to move along both rows of towers so that the equipment moves over tall grasses and remains within the grazing area. The mobile fence of the invention benefits from the advantages provided by front advance irrigation systems, preferably those of "Valley" trademark, which have reliable characteristics and a sufficiently strong and resistant supporting structure. In these irrigation systems at least two pairs of drive units are installed which set the limits, in the form of a fence, from one row to another through a system of cables and self-compensated and electric wires, where the device of the invention synchronizes the movements of the two equipment in a coordinated way and with modern electronic control systems. It also has a GPS positioning system to keep the fence within the lots, and a radio frequency system for communication between ramps, this avoids wiring and allows to adjust the size of the grazing area.

Figure 3A:
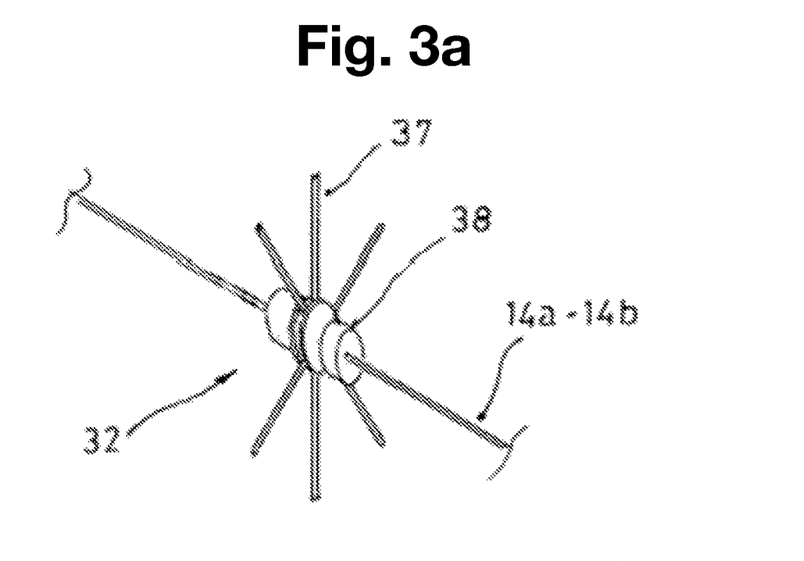
Figure 3B:
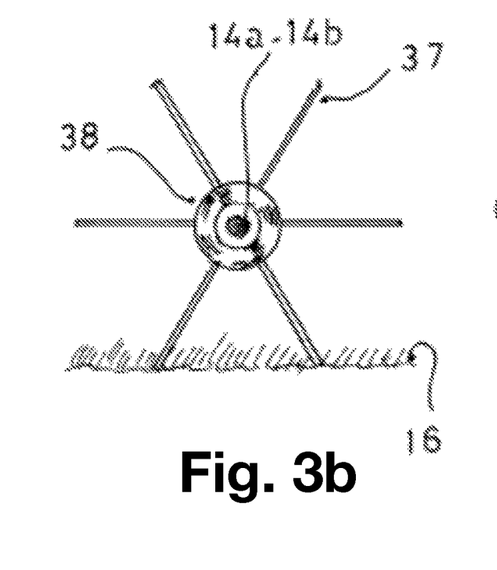
Figure 3C:
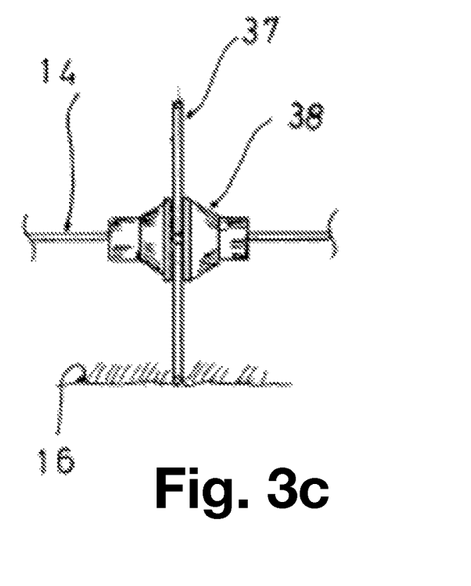

In the mentioned Figures of series 3, a wheel for the electric wire conductor dragged by the same rows (10, 20) of the towers is identified with reference (32). Device (32) consists of a central hub (38) where the electric conductor passes through (14), and this central hub (38) is freely rotated on said conductor. A series of radial shafts (37) or a disc (not illustrated) is projected from this central hub.

Figure 4A:
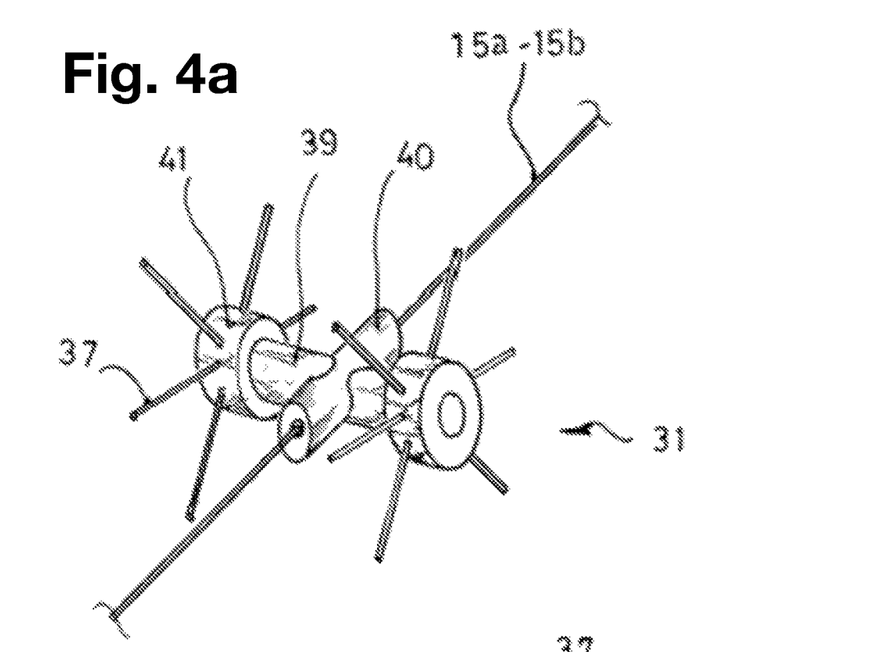
Figure 4B:
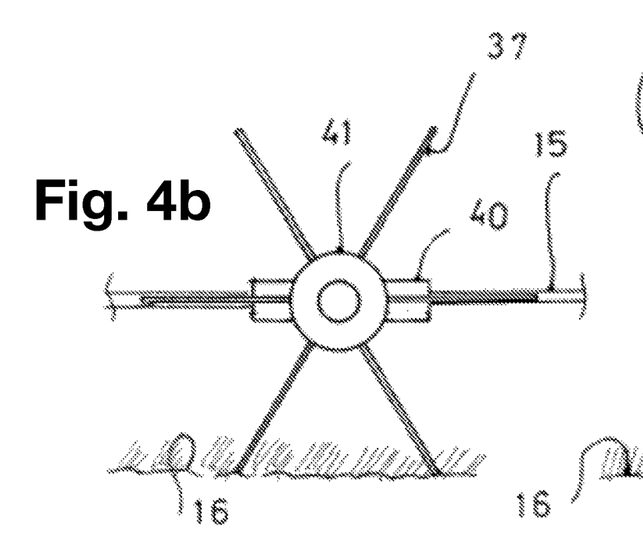
Figure 4C:
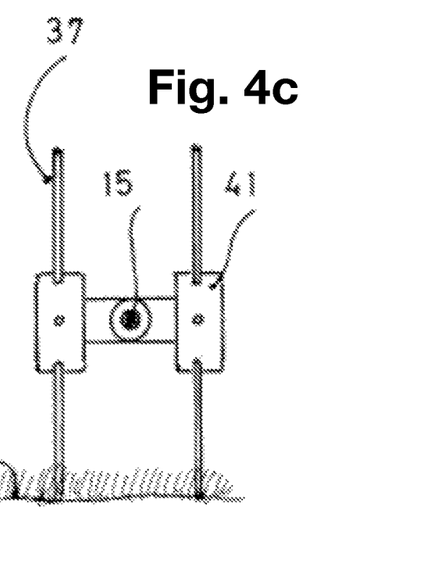

In the series of FIG. 4, a second wheel for the electric conductor is identified with reference (31) where the conductor sections (15) arranged between rows (10, 20) of the towers pass through. Device (31) consists of a central hub (40) where the electric conductor (15) passes through, and this central hub (40) is connected to a cross piece (39) at the extremes of which are connected the respective bodies (41)

which rotate on their axis. From each rotating body (41) a series of radial shafts (37) or a disc (not illustrated) is projected.

The connection of the electric fence to the towers of the rows (10, 20) is by means of metallic brackets (34) that include a set of pulleys and counterweights, in such a way that it maintains the tension of the fence in case of any variation in the relief, thus preventing the escape of animals. This set of pulleys and weights can be located in only one tower of the fence, where the wire passes through simple pulleys for the rest of the towers taking a closed turn and creating a fence once the two ends of the referred electric conductor join. The height of the mentioned conductor is preferably adjustable from 0.50 m to 1 m, depending on the animals enclosed within the fence. Likewise, these means (31, 32) allow to keep the wire suspended from the ground and to overcome obstacles during movement. For example, if for grazing reasons the fence is installed at 0.50 m, the wheel (31, 32) will be 1 m diameter, with the center located at 50 cm, which is where the wire will go through.

The wheels are light elements made of fiberglass and a metal center with a bearing that allows them to rotate, while the center of the hub allows the free passage and rotation of the conductor where height or clearance from the ground is kept. It allows to overcome obstacles, as shown in the preferred and illustrated version, through blades or shafts (37) when the obstacle is greater than the radius of the wheel, (31, 32) so that it can climb the obstacle over; and when the wire is tensioned (14, 15) the weights system allows the necessary distance to overcome the obstacle.

In this way animals are kept within the area intended for grazing which is adjusted to the field and animal density.

The fence of the invention provides a solution for intensive grazing by optimizing the yield of pastures and thus improving the quality of the diet of the animals, since grazing programs guarantee feed and water supply for the livestock.

The structures of the mobile fence of the invention move at programmable intervals which allow the adjustment of grazing time, respecting optimal physiological periods pasture growth, combined with a high animal load. In this manner, it is possible to maximize the production efficiency of pastures and the harvesting efficiency of animals. The result is a greater production of meat per hectare than in traditional grazing. Furthermore, optimal distribution of manure is achieved, which will be transformed into nutrients that will promote the growth of pastures.

Control of the movement of the towers is shown through the operator's interface by panel keys or telemetry system, which are located in the "master control panel". Said panel receives the commands set by the operator and checks the security system and GPS location after which it sends a signal through radiofrequency system which connects to the "slave panel". The "slave panel" checks the security system of that ramp and its GPS location and then information is returned. Once these variables are checked, the fence moves forward as instructed by the operator. In case any of these variables do not meet the conditions or present any flaws, the equipment stops the faulty ramp or tower and reports the failure to the other panel so that it will not move forward. Grazing time within the lot is established by adjusting the moving and stopping time of the fence.

The fence of the invention is equipped with several security levels. Irrigation equipment used as mobile ramps have a proven security system. The mobile fence shall use this physical security structure to verify the condition of the units and security status shall be determined through control panels, thus, it allows the performance of ordered commands or stops the equipment in case of system failure.

The fence of the invention works autonomously. The fence can be equipped with solar panels on the main pipe of at least one of the mobile rows and a battery bank, an inverter, and a combustion engine with a 15 Kwa generator on one of the towers. In case there are factors that prevent solar supply during displacement and empty batteries, the generator is available to be switched on and continue with the programmed tasks.

Control communication is made through a radio signal which operates in a 2.4 Ghz radio band, which is of free use worldwide. These signals are transmitted from the control panels of both ramps since it is a bidirectional communication and the signal range depends on direct vision between nodes (antennas on rows), in our case, it is in the open field free from obstacles, which guarantees optimum communication. It should be noted that this type of signal may be interfered if obstacles are found between antennas, which, as mentioned above, is not the case. This system is in charge of issuing and collecting command signals from all points of the equipment where the master control signal with preset parameters will allow the fence to perform the intended work.

The rows with the towers have a control panel each, this control panel can be operated manually by indicating the action to be performed, these actions may include a forward movement, reverse movement, speed variation or irrigation requirements. This panel delivers the instructions to the radio frequency control module that converts the digital signals into radio waves, and they are received and communicated by the radio frequency module of the second row, and these are again converted into digital signals in the control panel of this second row to activate the same actions immediately. This synchronization maintains the tower rows (10, 20) working at the preset distance according to the fence size, which always sets the same size regardless of the movement.

Figure 6:
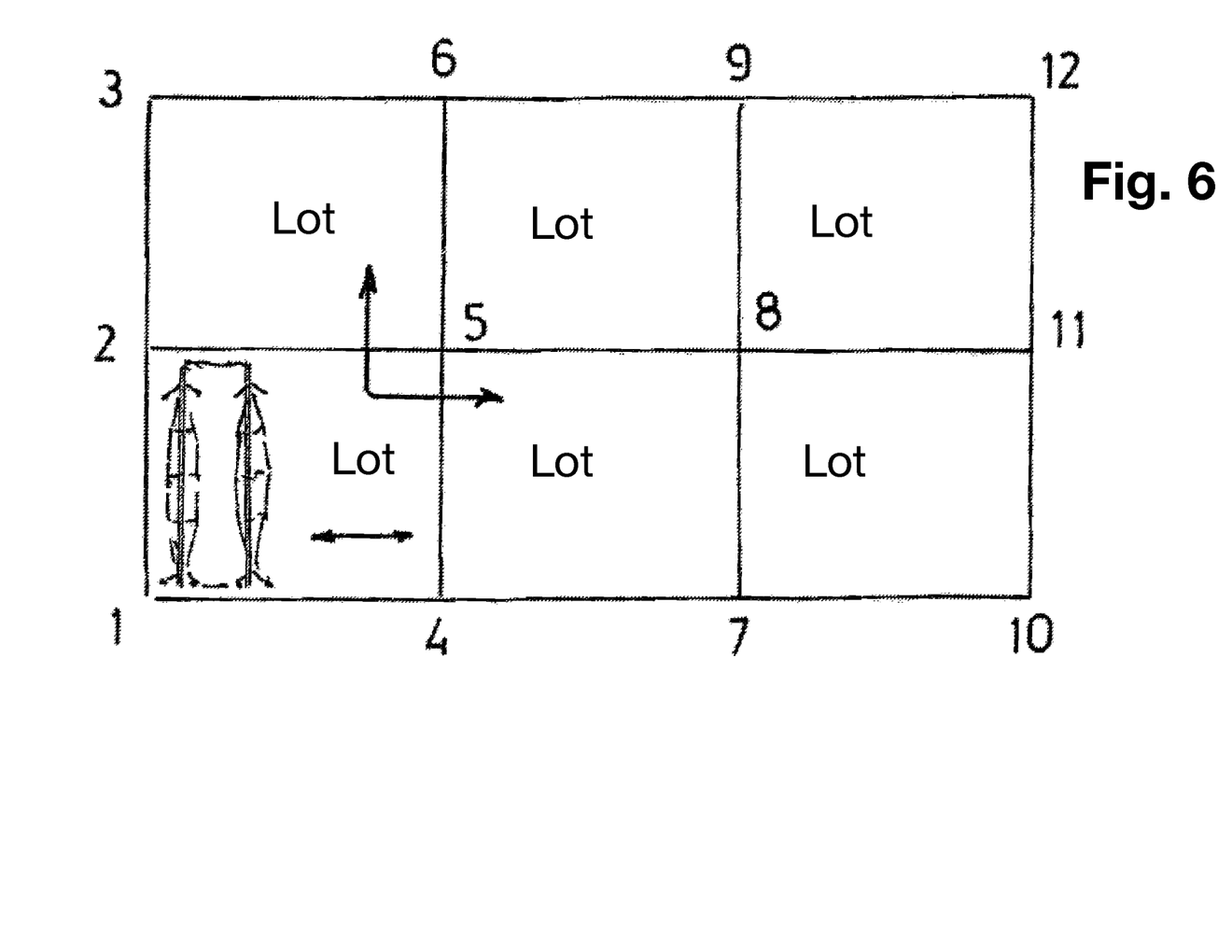
FIG. 6 shows schematically a possible operation modality of the fence in its subsequent programmed displacements.

According to FIG. 6, the mobile fence has a positioning system controlled by a GPS, this system is designed to establish the location that allows to delimit the grazing area accurately within the lots. The GPS positioning system allows the master control module to set the parameters and delimit the coordinates of the lots and maintain the mobile fence system within the limits of the field, as well as to locate the machine according to the movement.

In principle, data about the limits of the grazing areas are collected by making a grid of the lot, then this information is entered into the control panel that physically locates the equipment in the field. By using this system, the equipment has already preloaded the operating limits and according to the programming indicated by the operator, rotational grazing can be designed.

In FIG. 6, a diagram that shows the delimitation of the lots in a field can be seen. The very first thing is to collect the coordinates of each grazing lot represented by numbers 1 to 12, this is how the limits of the lots are obtained to be entered into the control panel. This data is stored as a reference for the actions to be taken by the operator, then the mobile fence is observed under operation in lot 1, once the work on this lot is completed the fence is instructed to move, as shown by the dotted arrows, to one of the adjacent lots as requested by the operator. But as the control panel has the coordinates already stored in the digital memory, movement will be referenced automatically by the GPS module.

Displacement calculations based on time and size of wheels:

In order to supplement the displacement of the fence and increase the accuracy of the system, the control panel will be calculating the advance rate on the basis of the time of displacement and the size of the wheels, and calculation will be used to establish the limits in a logical manner and compared with the data from the GPS system. The main purpose of this system is to increase the safety of the equipment and to fine tune the parameters of the movement.

Since the advance rate of the wheel is known at 100% and the speed is controlled, calculations of the distance covered in time can be made. If the equipment is at 100% and travels 4.26 m. per minute, it is possible to estimate the time it takes to cover a lot, a fact that enables to compare the GPS position and the physical movement of the equipment.

Figure 7:
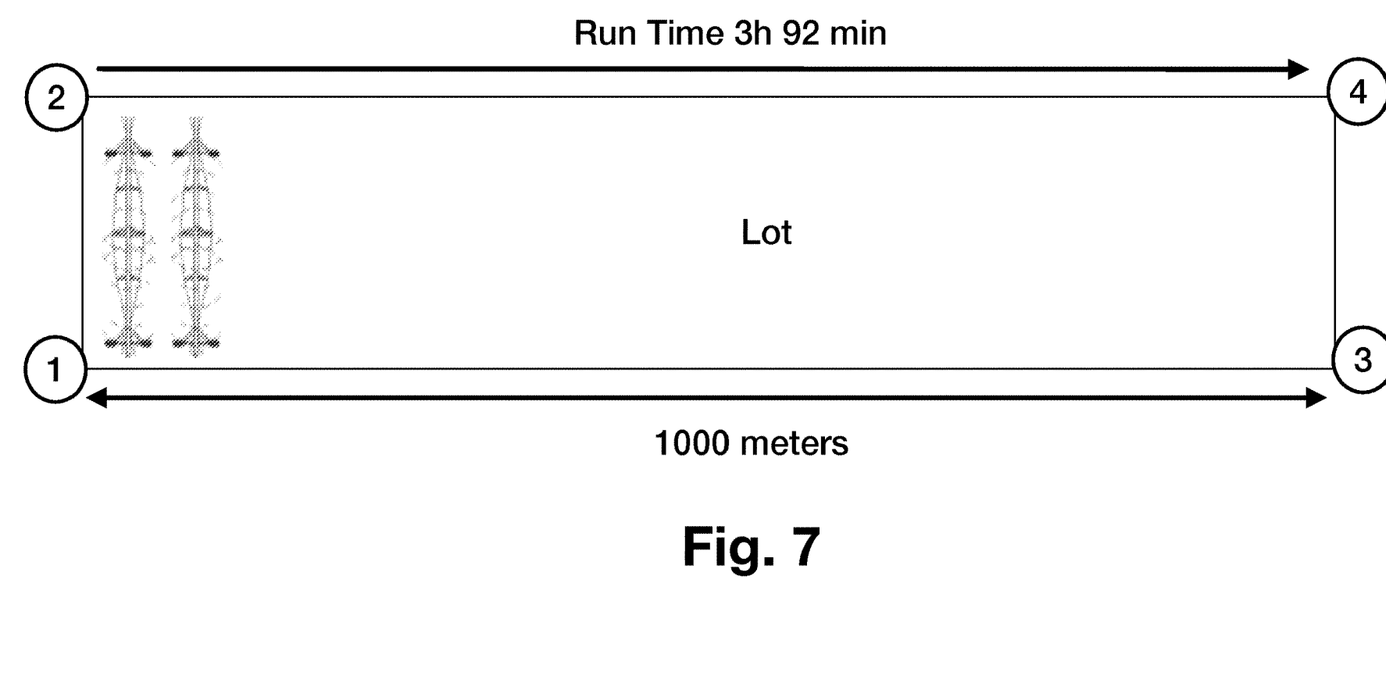
FIG. 7 shows the path of the equipment in a 1000 m lot.

The image of FIG. 7 shows the path of the equipment in a 1000 m lot. This will take 3 hours and 92 minutes, if the length of 1000 m is divided by 4.25 m, which is what the equipment would take to cover the distance in 1 min. This calculation allows the equipment to move, and if by any chance GPS signal is lost, the control panel knows where it is located; as well as once the estimated time has elapsed, the established coordinate of the perimeter of the lot must coincide with the current location of the equipment.

Alignment and guidance system where drive units make adjustments to remain within the lines of movement:

It is essential to maintain the guidance of the equipment and that is the reason why Valley irrigation equipment already has a guidance system that works based on alignment and misalignment. This takes place when one of the ends of the drive unit, for some reason, moves forward more than the other or, on the contrary, it remains slightly behind. By using this alignment system, the machine sends the advance or stop order to the tower that requires adjustment until the drive unit is in line and can continue to move forward correctly.

The guiding system consists of two Valley grooves featuring guiding boxes, arms and skids mounted on the ramp trolley as shown in the picture. These skids track a "V" shaped groove, 101.6 mm-152.4 mm deep along the field.

When the ramp moves away from the groove, the guiding arm will activate a direction switch that will return the trolley to the correct position. If the direction switch is to fail, a backup safety switch will turn off the machine.

The mobile fence of the invention benefits from the advantages provided by proven "Valley" front advance irrigation systems which have reliable characteristics and a sufficiently strong and resistant supporting structure. This fence has two drive units that delimit, in the form of a fence, from one row to another with a system of cables and self-compensated and electric wires, where the device of the invention synchronizes the movements of the two equipment in a coordinated way and with modern electronic control systems. It also has a GPS positioning system to keep the fence within the lots, and a radio frequency system for communication between ramps, this avoids wiring and allows to adjust the size of the grazing area. In this way we manage to keep the animals within the area intended for grazing and adjusted to the field and animal density.

Additional components to the Mobile Fence of the Invention:

The following supplementary components can be added to the supporting structures.

Water troughs: as many troughs as necessary may be hung to the mobile structure which will remain inside the fence at the disposal of the animals at all times. Said troughs will be supplied either by a refillable water tank or by groundwater infrastructure with hydrants distributed in the lot which will be connected through a hose and will supply fresh water at all times.

Feeding troughs: may be hung for feed supplements or salts as required by the animals.

Shade: Plastic structures provided with half-shade mesh may be hung to create shade areas inside the pen.

Water spraying: the mobile structure can carry micro-sprinklers to apply droplets of fresh water to reduce the body temperature of animals inside the pen.

Application of agrochemicals: The structure can carry a system to apply liquid fertilizers, herbicides or insecticides necessary for pasture management.

Irrigation: the structure can apply irrigation once the animals have been grazed inside the pen, thus accelerating the regrowth of pastures.

Audio-visual monitoring: the structure can carry remote monitoring cameras to check, through audio and image, the condition of the animals inside the pen.

Functional music: the structure can carry a functional music device which improves animal welfare inside the pen.

Fodder level sensors: these sensors can be used to control the feeding speed.

NFC sensors: with these sensors, through NFC technology, an automatic daily count of cattle heads can be made in the pen.

The invention claimed is:

1. A modular autonomous mobile fence, delimiter of grazing areas, characterized by comprising:
    first and second structures arranged substantially facing and spaced apart from each other, wherein each structure includes at least two movable towers arranged at ends of a same row and being structurally linked to each other forming a movable row;
    at least one electrified conducting wire extending along a length of said first and second structures and between movable towers located at the same end of said first and second structures forming an enclosed quadrilateral area; and
    separating elements separating said at least one electrified conducting wire from the ground and tensioning elements tensioning said at least one electrified conducting wire throughout said enclosed quadrilateral area, wherein said first and second structures and said enclosed quadrilateral area are selectively displaceable from one property or lot to another property or lot.

2. The mobile fence according to claim 1, wherein said enclosed quadrilateral area contains animals that are displaced along with said first and second structures and said enclosed quadrilateral area when selectively displaced from said one property or lot to said another property or lot.

3. The mobile fence according to claim 1, wherein each of said movable rows further comprises a plurality of intermediate movable towers provided between the movable towers arranged at the ends of said same row and being mechanically coupled to said movable towers in order to be displaced together with said movable towers.

4. The mobile fence according to claim 1, wherein each movable tower includes a motor for automatic movement of each movable tower.

5. The mobile fence according to claim 1, wherein said separating elements comprise a central hub receiving within said at least one electrified conducting wire and a plurality of radial shafts projecting from said central hub so that said central hub freely rotates over said at least one electrified conducting wire when displaced by said movable rows.

6. The mobile fence according to claim 1, wherein said separating elements comprise a central hub receiving within said at least one electrified conducting wire and being connected to a cross piece having a first end and a second end, each end having a body with a plurality of radial shafts projecting from said body.

7. The mobile fence according to claim 1, wherein said tensioning elements include at least one bracket coupled to a movable tower and including pulleys and counterweights for maintaining the tension of the fence and compensating for any ground level variation.

8. The mobile fence according to claim 1, wherein said first structure includes a first control panel and said second structure includes a second control panel configured to communicate with each other to perform at least one of a forward movement of the fence, a reverse movement of the fence, speed variation of the fence or irrigation control of the fence so that both structures a maintain a predefined distance between each other based on a fence size.

9. The mobile fence according to claim 8, wherein said control panels communicate with each other by exchanging instruction signals to ensure that both structures are controlled with the same actions.

10. The mobile fence according to claim 9, wherein said instruction signals are communicated wirelessly.

11. The mobile fence according to claim 8, further comprising a GPS-controlled positioning system that allows one of said control panels to act as a master control module for performing at least one of setting operating parameters, delimiting coordinates of the property or lot, maintaining the mobile fence within limits of a field or locating a position of the fence based on the movement of said fence.

12. The mobile fence according to claim 1, further comprising a GPS-controlled positioning system to establish a location that allows delimiting a grazing area within the property or lot.

13. The mobile fence according to claim 1, wherein both structures are arranged facing each other, separated and parallel so that the at least one electrified conducting wire determines a grazing area with a quadrangular configuration.

14. The mobile fence according to claim 1, wherein each movable tower comprises a module with a length of 54.5 m and a height of 3.65 m.

15. The mobile fence according to claim 1, wherein each structure includes up to seven movable towers.

16. The mobile fence according to claim 15, wherein each structure includes seven movable towers with a total length of 380 m.

17. The mobile fence according to claim 1, wherein at least one of said structures includes a water trough.

18. The mobile fence according to claim 1, wherein at least one of said structures includes a solar panel.

19. The mobile fence according to claim 1, wherein each movable tower includes a motor for automatic movement of each movable tower independent of other movable towers.

* * * * *